United States Patent
Sankaran et al.

(10) Patent No.: US 8,715,608 B2
(45) Date of Patent: May 6, 2014

(54) GROWTH OF SINGLE-WALLED CARBON NANOTUBES

(75) Inventors: R. Mohan Sankaran, University Heights, OH (US); Wei-Hung Chiang, Gainesville, FL (US)

(73) Assignee: Case Western Reserve University, Cleveland, OH (US)

( * ) Notice: Subject to any disclaimer, the term of this patent is extended or adjusted under 35 U.S.C. 154(b) by 128 days.

(21) Appl. No.: 12/955,599

(22) Filed: Nov. 29, 2010

(65) Prior Publication Data

US 2011/0165058 A1 Jul. 7, 2011

Related U.S. Application Data

(60) Provisional application No. 61/264,969, filed on Nov. 30, 2009.

(51) Int. Cl.
*D01F 9/12* (2006.01)
*B01J 23/755* (2006.01)
*B82Y 40/00* (2011.01)

(52) U.S. Cl.
USPC .............. 423/447.3; 423/447.1; 977/751; 977/843; 502/337

(58) Field of Classification Search
USPC ........ 423/447.1–447.3, 445 B; 977/742–754, 977/842–848, 896; 502/337
See application file for complete search history.

(56) References Cited

PUBLICATIONS

Fazle Kibria, et al., Synthesis of carbon nanotubes over nickel-iron catalysts supported on alumina under controlled conditions, Catalysis Letters 2001; 71(3-4): 229-236.*
Chiang, et al., In-Flight Dimensional Tuning of Metal Nanoparticles by Microplasma Synthesis for Selective Production of Diameter-Controlled Carbon Nanotubes, J. Phys. Chem. C 2008; 112: 17920-17925.*
Camata, et al., Size classification of silicon nanoparticles, Appl. Phys. Lett. 1996; 68(22): 3162-3164.*
Satishkumar, et al., Chemical Physics Letters, 1998; 293: 47-52.*
Chiang, et al., Microplasma synthesis of metal nanoparticles for gas-phase studies of carbon nanotube growth, Applied Physics Letters 2007; 91: 121503-1 to 121503-3.*
Chiang, et al., Syngergistic Effects in Bimetallic Nanoparticles for Low Temperature Carbon Nanotube Growth, Adv. Mater. 2008; 20: 4857-4861 (published online Dec. 16, 2008).*
Definition of provide, accessed online at <http://www.merriam-webster.com/dictionary/providing?show=1&t=1371421396> on Jun. 16, 2013.*
Bachilo, et al., Narrow (n,m)-Distribution of Single-Walled Carbon Nanotubes Grown Using a Solid Supported Catalyst, J. Am. Chem. Soc. 2003; 125: 11186-11187.*

(Continued)

*Primary Examiner* — Daniel C McCracken
(74) *Attorney, Agent, or Firm* — Kaplan Breyer Schwarz & Ottesen, LLP (57) ABSTRACT

A method for synthesizing carbon nanotubes having a narrow distribution of diameter and/or chirality is presented. The method comprises providing catalyst particles to a reactor for synthesizing the carbon nanotubes, wherein the catalyst particles are characterized by a narrow distribution of catalyst-particle diameters and a narrow distribution of catalyst-particle compositions. Preferably, the catalyst particles are characterized by a mean catalyst-particle diameter of 2.6 nm or less and a composition of $Ni_xFe_{1-x}$, wherein x is less than or equal to 0.5.

7 Claims, 7 Drawing Sheets

(56) References Cited

PUBLICATIONS

Chiang et al., "Linking catalyst composition to chirality distributions of as-grown single-walled carbon nanotubes by tuning NixFe1-x na", "Nature Materials—Letters—Advance Online Publication www.nature,com/naturematerials", Sep. 20, 2009, Publisher: Macmillan Publishers Limited.

Chiang et al., "In-Flight Dimensional Tuning of Metal Nanoparticles by Microplasma Synthesis for Selective Production of Diameter-Contro", "Journal of Physical Chemistry C XXXX", Oct. 29, 2008, vol. xxx, No. xx, Publisher: XXXX American Chemical Society.

Chiang et al., "Nanoengineering NixFe1-x Catalysts for Gas-Phase, Selective Synthesis of Semiconducting Single-Walled Carbon Nanotubes", "www.acsnano.org", 2009, pp. 4023-4032, vol. 3, No. 12, Publisher: American Chemical Society.

Fahey, Jonathan, "The Promise of Nanotubes", "Out of the Labs forbes.com/.../carbon-sciences-semico . . . ", Oct. 7, 2009, Publisher: Forbes.com.

* cited by examiner

GROWTH OF SINGLE-WALLED CARBON NANOTUBES

CROSS-REFERENCE TO RELATED APPLICATION

This application claims the benefit of U.S. Provisional Patent Application Ser. No. 61/264,969, filed Nov. 30, 2009, entitled "Chiral-selective Growth of Single-walled Carbon Nanotubes," which is incorporated herein by reference.

FIELD OF THE INVENTION

The present invention relates to material synthesis in general, and, more particularly, to the synthesis of carbon nanotubes.

BACKGROUND OF THE INVENTION

A carbon nanotube (CNT) is a one-carbon-atom-thick layer of graphite (i.e., a graphene sheet) rolled into a seamless, closed cylinder. Typical CNT diameters are a few nanometers (nm) or less but they can have lengths that are in the millimeter range or larger.

Carbon nanotubes exhibit unique physical, electrical, and chemical properties that offer the potential for revolutionary impact in a broad range of diverse applications areas, such as electronics, materials, medicine, law enforcement, architecture, national defense, and fashion. These properties depend on the physical characteristics of the carbon nanotube, such as the number of walls (i.e., single-wall, double-wall, etc.), diameter, and chirality (i.e., the way the graphene sheet is wrapped about itself). For example, depending upon its structure, a CNT can behave like a metal, such as gold or aluminum, or like a semiconductor, such as silicon or gallium arsenide.

Carbon nanotubes are synthesized in a number of ways, including arc discharge formation, laser ablation, and chemical vapor deposition. Unfortunately, it has proven difficult to selectively produce large volumes of CNTs having uniform material characteristics in a cost-effective manner. This has proven to be a barrier to their use in many applications—particularly those wherein a specific chirality is desired.

In order to isolate particular types of CNTs, high-volume, non-selective synthesis has been coupled with post-synthesis sorting techniques. Several sorting approaches have been demonstrated, the most promising of which is based on density-based centrifugation of a slurry of disparate carbon nanotubes. This approach is still too expensive for consideration in large-scale systems, however.

A method for synthesizing carbon nanotubes having improved purity would represent a significant advance in the state-of-the-art in nanotechnology.

SUMMARY OF THE INVENTION

The present invention enables the substantially selective synthesis of carbon nanotubes characterized by a desired diameter and chirality without some of the costs and/or limitations of the prior art. Embodiments of the present invention are well suited for synthesizing carbon nanotubes characterized by a narrow distribution of carbon-nanotube diameter and/or narrow distribution of carbon-nanotube chirality.

The present invention substantially decouples the influence of catalyst-particle size and catalyst-particle composition on carbon nanotube chirality and size. Some embodiments of the present invention comprise selection of a first preferred value for catalyst-particle diameter based on a relationship between catalyst-particle diameter and carbon-nanotube diameter. Carbon nanotubes are then synthesized in the presence of catalyst particles having a mean catalyst-particle diameter substantially equal to this first preferred value. Some embodiments of the present invention further comprise selection of a second preferred value for catalyst-particle composition based on a relationship between catalyst-particle composition and carbon-nanotube chirality. Carbon nanotubes are then synthesized in the presence of catalyst particles characterized by the second preferred value for catalyst-particle composition as well as the first preferred value for catalyst-particle diameter.

In some embodiments, catalyst particles having a mean diameter of 2.6 nm or less are provided to a reactor for synthesizing carbon nanotubes. In some embodiments, the mean diameter of the catalyst particles is substantially equal to 2.2 nm. In some embodiments, the catalyst particles are synthesized in a catalyst reactor prior to being provided to the reactor for synthesizing carbon nanotubes.

In some embodiments, nickel-iron catalyst particles having a composition of $Ni_xFe_{1-x}$, wherein x is less than or equal to 0.5 are provided to the reactor for synthesizing carbon nanotubes. In some embodiments, the composition of the catalyst particles is substantially $Ni_{0.27}Fe_{0.73}$. In some embodiments, the catalyst particles are synthesized in a catalyst reactor prior to being provided to the reactor for synthesizing carbon nanotubes.

In some embodiments, the present invention comprises selection of a catalyst reactor having a reactor volume that is less than one nanoliter. Restricting reactor volume to less than one nanoliter enables growth of catalyst particle populations characterized by a narrow distribution of catalyst-particle diameters that are less than 5 nm.

An embodiment of the present invention comprises a method for synthesizing carbon nanotubes, wherein a first relationship exists between a first property of a first catalyst particle comprising a first metal and a second property of a first carbon nanotube synthesized via the first catalyst particle, the method comprising: selecting a first preferred value for the first property based on the first relationship; providing a plurality of catalyst particles to a first reaction chamber, each of the plurality of catalyst particles being characterized by the first property having a value substantially equal to the first preferred value; controlling the concentration of a first gas in the first reaction chamber, the first gas comprising carbon; and controlling the temperature of the first reaction chamber.

DETAILED DESCRIPTION

Figure 1:
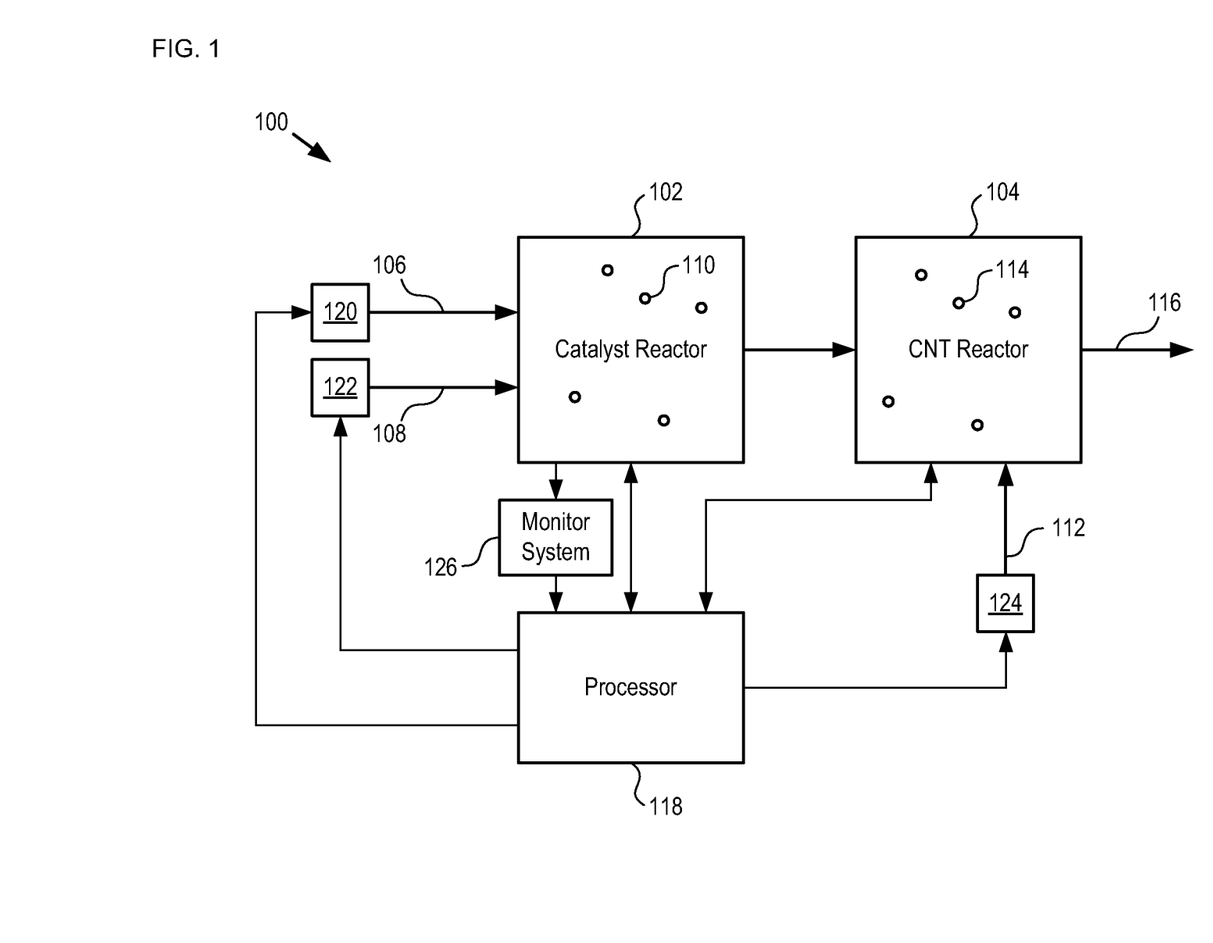
FIG. 1 depicts a schematic diagram of a continuous-flow, gas-phase carbon nanotube reactor system in accordance with an illustrative embodiment of the present invention.

FIG. 1 depicts a schematic diagram of a continuous-flow, gas-phase carbon nanotube reactor system in accordance with an illustrative embodiment of the present invention. System 100 comprises catalyst reactor 102, CNT reactor 104, gas inlets 106, 108, and 112, and outlet 116. System 100 synthesizes carbon nanotubes 114 by decomposing gas 112 in CNT reactor 104. The synthesis of carbon nanotubes 114 occurs via the presence of catalyst particles 110 in the CNT reactor.

Figure 2:
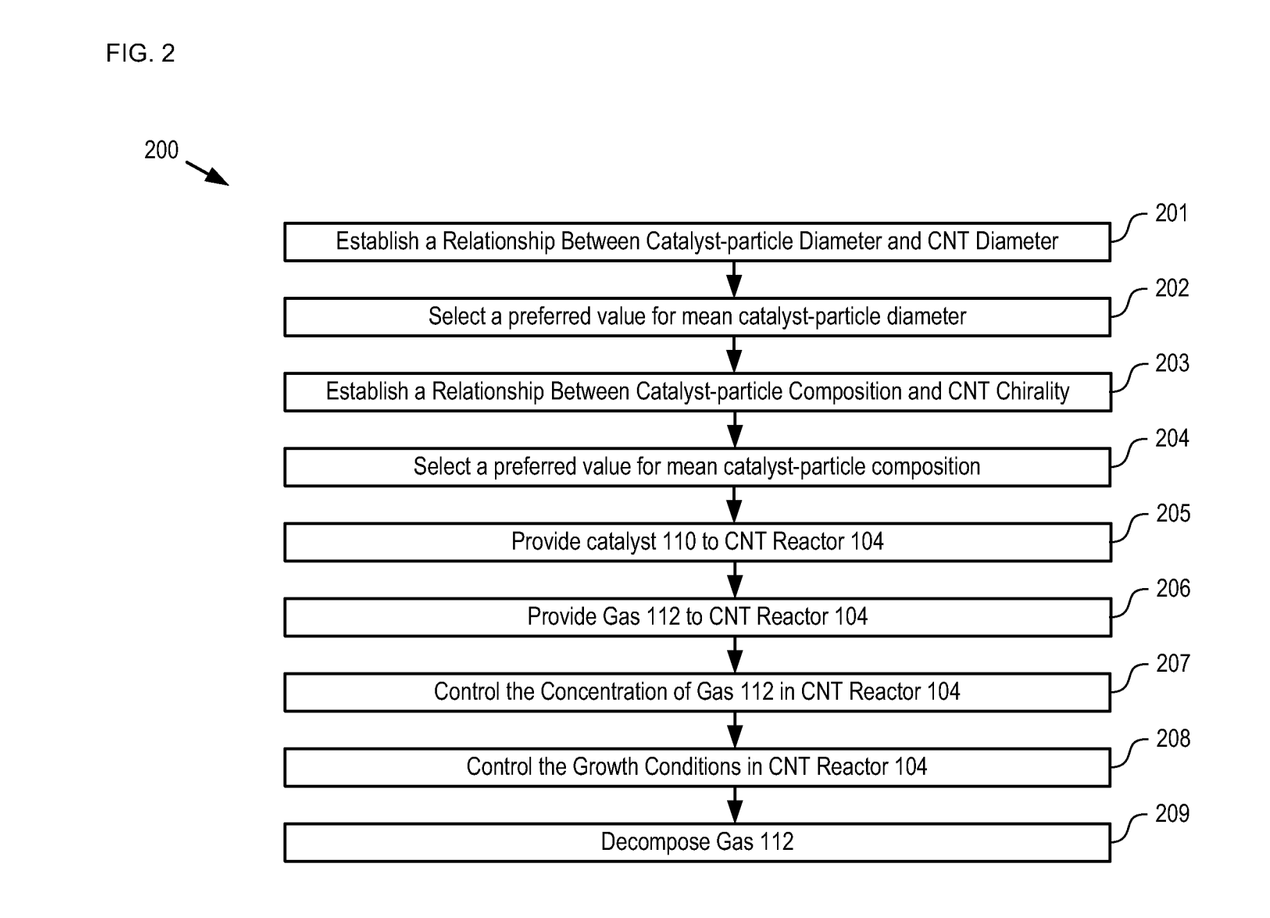
FIG. 2 depicts operations of a method for synthesizing carbon nanotubes in accordance with the illustrative embodiment of the present invention.

FIG. 2 depicts operations of a method for synthesizing carbon nanotubes in accordance with the illustrative embodiment of the present invention. It is an aspect of the present invention that carbon nanotubes having a set of desired material properties can be selectively synthesized by selecting and controlling the size and/or composition of the catalyst particles used to enable the synthesis. Method 200 begins with operation 201, wherein a relationship between catalyst-particle diameter and carbon-nanotube diameter is established.

Figure 3:
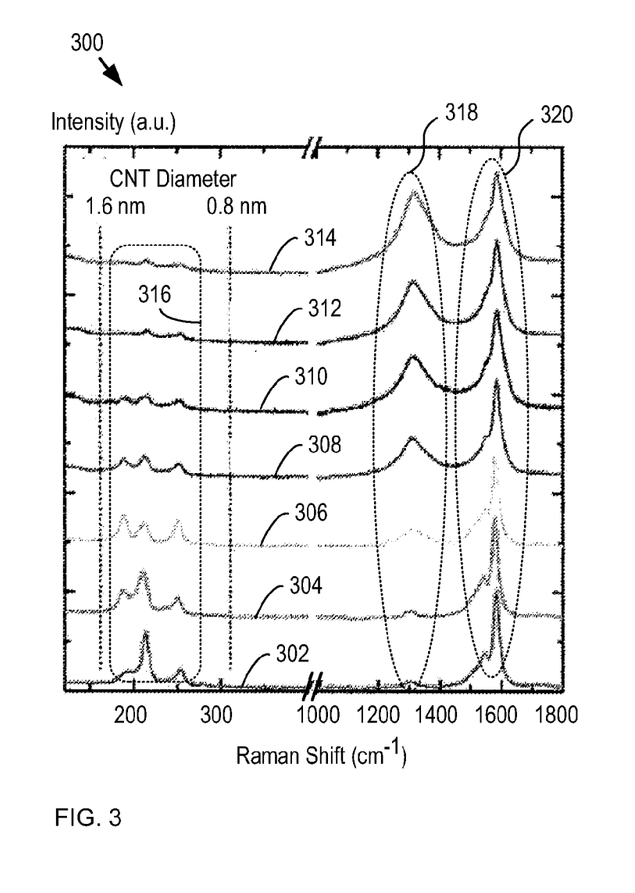
FIG. 3 depicts Raman spectra for carbon nanotube samples grown via catalyst particles having different catalyst-particle diameters in accordance with the illustrative embodiment of the present invention.

FIG. 3 depicts Raman spectra for carbon nanotube samples grown via catalyst particles having different catalyst-particle diameters in accordance with the illustrative embodiment of the present invention. Plot 300 shows the intensity spectra for carbon nanotube samples 302, 304, 306, 308, 310, 312, and 314, grown via catalyst particles having mean catalyst-particle diameters of 2.2, 2.5, 2.6, 2.7, 2.8, 2.9, and 3.1 nm, respectively. The spectra for each of carbon nanotube samples 302, 304, 306, 308, 310, 312, and 314 is normalized with respect to G-band (1545 cm$^{-1}$) intensity peak 320.

Several characteristics of the grown nanotubes are inferred from the data shown in plot 300. First, the spectra clearly exhibit radial breathing-mode (RBM) peaks 316 in the range of 120-250 cm$^{-1}$. These peaks are characteristic of single- or double-wall carbon nanotubes. The intensity of peaks 316 for samples 302 through 314 increases as the catalyst-particle diameter decreases, which indicates a higher percentage of single-wall and double-wall carbon nanotubes in the carbon nanotube samples grown via smaller diameter catalysts.

Second, one skilled in the art will recognize that the diameter and chirality of bundled single- or double-walled carbon nanotubes is determined from the position of the RBM peaks using the relationship $\omega_{RBM}=234/d+10$, wherein $\omega_{RMB}$ is the RMB frequency and d is the nanotube diameter. From plot 300, it is evident that peaks 316 of carbon nanotube sample 302 (i.e., grown via catalyst particles having a mean particle-diameter of 2.2 nm) appear at 192, 214, and 254 cm$^{-1}$. This corresponds to a carbon-nanotube diameter within the range of 0.8-1.6 nm. One skilled in the art will recognize that carbon-nanotube diameter is indicative of the number of walls in a carbon nanotube and that a carbon-nanotube diameter less than 1.6 nm indicates a single-wall carbon nanotube.

Third, peaks 320 exhibit splitting that becomes more pronounced as the diameter of the catalyst particle decreases. Such splitting is due to zone folding of the phonon dispersion in single-wall carbon nanotubes. This demonstrates that the purity of single-wall carbon nanotubes increases with decreasing catalyst-particle diameter.

Fourth, peaks 318 increase in intensity with particle diameter. The increased intensity is associated with increasing disorders or amorphous carbon in multi-walled carbon nanotubes, which suggests a decrease in the purity of single-wall carbon nanotubes with increasing catalyst-particle diameter.

Figure 4:
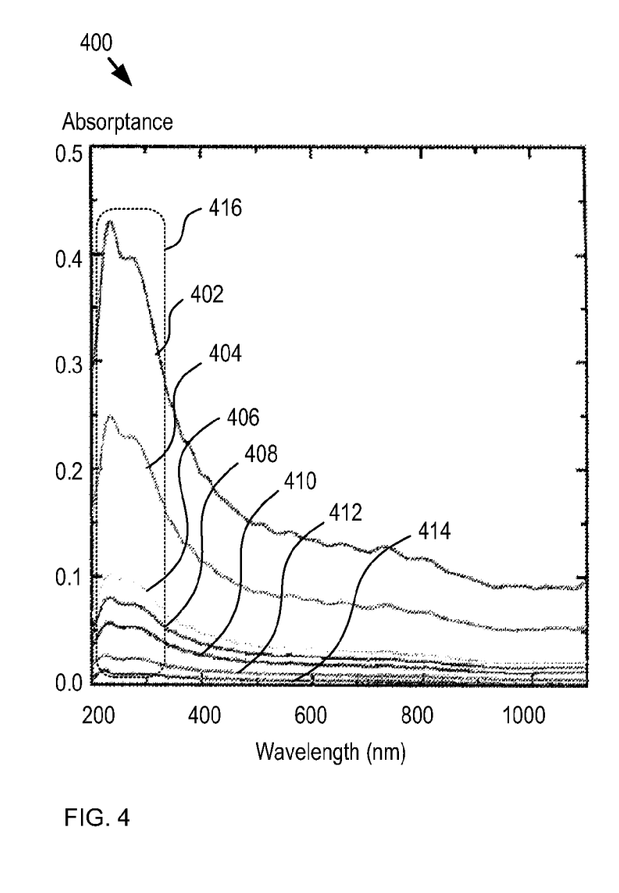
FIG. 4 depicts absorption spectra for carbon nanotube samples grown via catalyst particles having different mean diameters in accordance with the illustrative embodiment of the present invention.

FIG. 4 depicts absorption spectra for carbon nanotube samples grown via catalyst particles having different mean diameters in accordance with the illustrative embodiment of the present invention. Plot 400 shows the absorption spectra for carbon nanotube samples 402, 404, 406, 408, 410, 412, and 414, grown via catalyst particles having mean catalyst-particle diameters of 2.2, 2.5, 2.6, 2.7, 2.8, 2.9, and 3.1 nm, respectively.

Peaks 416 arise from surface excitation of single-wall carbon nanotubes. Plot 400 shows that peaks 416 decrease in intensity with increasing catalyst-particle diameter. This decrease is due to that fact that the fraction of single-wall carbon nanotubes is decreasing with increasing catalyst-particle diameter.

In contrast, peaks 316 of the spectra for carbon nanotube samples 304 through 314 (i.e., for catalyst particles of increasing diameter) show an increasing ratio of the intensity of the peaks at 192-212 cm$^{-1}$. This confirms that the use of these catalyst particles leads to the formation of carbon nanotubes having larger diameters (i.e., multi-wall carbon nanotubes).

At operation 202, a preferred value for catalyst-particle diameter of catalyst particles 110 is selected based on the relationship between catalyst-particle diameter and carbon-nanotube diameter and wall number established in operation 201. Based on this relationship, it is an aspect of the present invention that the preferred value for mean catalyst-particle diameter for catalyst particles 110 is selected as a diameter of less than 2.5 nm. In some embodiments, the preferred value for mean catalyst-particle diameter for catalyst particles 110 is selected as approximately 2.2 nm. In some embodiments, the preferred value for mean catalyst-particle diameter for catalyst particles 110 is selected as less than 2.2 nm. By choosing a preferred value for catalyst-particle diameter of <2.5 nm, the present invention enables substantially selective synthesis of carbon nanotubes having diameters less than approximately 1.6 nm (i.e., single-wall carbon nanotubes).

At operation 203, a relationship between catalyst-particle composition and carbon-nanotube chirality is established. It is an aspect of the present invention that carbon-nanotube diameter and carbon-nanotube chirality are constrained by the size and composition of the catalyst particle that enables its synthesis. The present invention, therefore, decouples the provision of catalyst particles having a specific diameter from the provision of catalyst particles having a specific composition. This decoupling is accomplished by enabling separate control over catalyst-particle diameter and catalyst-particle composition.

Figure 5A:
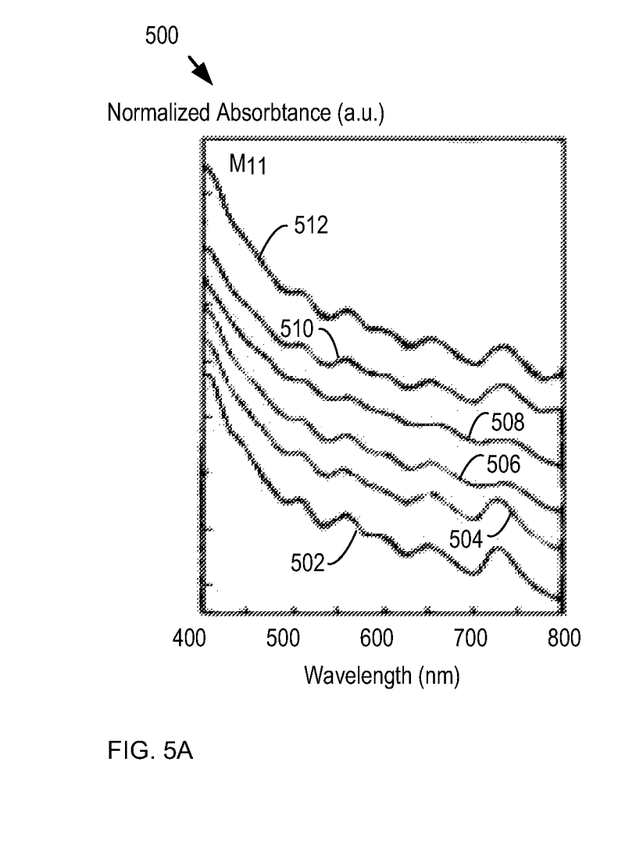
FIGS. 5A and 5B depict absorption spectra for carbon nanotube samples grown with different growth conditions in accordance with the illustrative embodiment of the present invention.
Figure 5B:
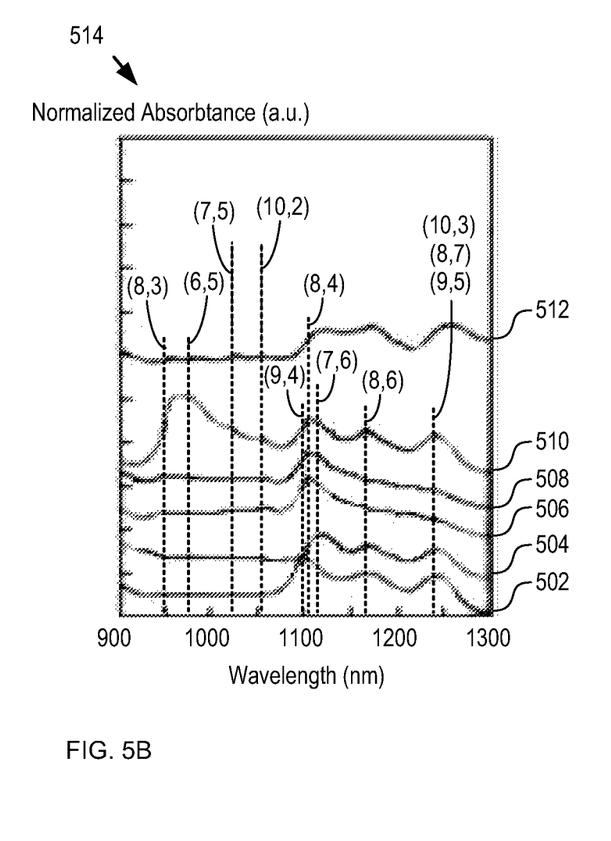

FIGS. 5A and 5B depict absorption spectra for carbon nanotube samples grown with different growth conditions in accordance with the illustrative embodiment of the present invention. Each of plots 500 and 514 comprises absorption spectra for carbon nanotubes samples 502, 504, 506, 508, 510, and 512. Carbon nanotube sample 502 was grown via catalyst particles having a composition of pure nickel, at a growth temperature of 600° C. Carbon nanotube sample 504 was grown via catalyst particles having a composition of $Ni_{0.67}Fe_{0.33}$, at a growth temperature of 600° C. Carbon nanotube sample 506 was grown via catalyst particles having a composition of $Ni_{0.5}Fe_{0.5}$, at a growth temperature of 600° C. Carbon nanotube sample 508 was grown via catalyst particles having a composition of $Ni_{0.27}Fe_{0.73}$, at a growth temperature of 600° C. Carbon nanotube sample 510 was grown via catalyst particles having a composition of $Ni_{0.27}Fe_{0.73}$, at a growth temperature of 700° C. Carbon nanotube sample 512 was grown via catalyst particles having a composition of pure iron, at a growth temperature of 700° C. Each carbon nanotube sample was synthesized via catalyst particles having a mean catalyst-particle diameter of 2 nm. The spectra for each of carbon nanotube samples 502, 504, 506, 508, 510, and 512 is normalized with respect to the sample intensity at 587 nm and offset from one another for clarity.

Plots 500 and 514 illustrate that the composition of the catalyst particles used significantly affects the chirality of the synthesized carbon nanotubes. For example, spectra for carbon nanotube samples 502 through 510 show a decrease in the $M_{11}$ peak intensities as iron content is increased in samples grown at 600° C. The decrease in the $M_{11}$ peak intensity indicates a depletion of metallic nanotubes in the synthesized samples.

The chirality (i.e., the manner in which the graphene sheet of a carbon nanotube is wrapped) is represented by a pair of indices (n,m), referred to as the "chiral vector" of the carbon nanotube. The integers n and m denote the number of unit vectors along two directions in the crystal lattice of graphene.

As seen in plots 500 and 514, the simultaneous shift in the $S_{11}$ region from (9,4) carbon nanotubes in sample 502 to (7,6) carbon nanotubes in sample 504 to (8,4) carbon nanotubes in sample 510 further demonstrates improvement in the growth selectivity of semiconductor-type carbon nanotubes with increasing iron content in the catalyst particles.

Figure 6A:
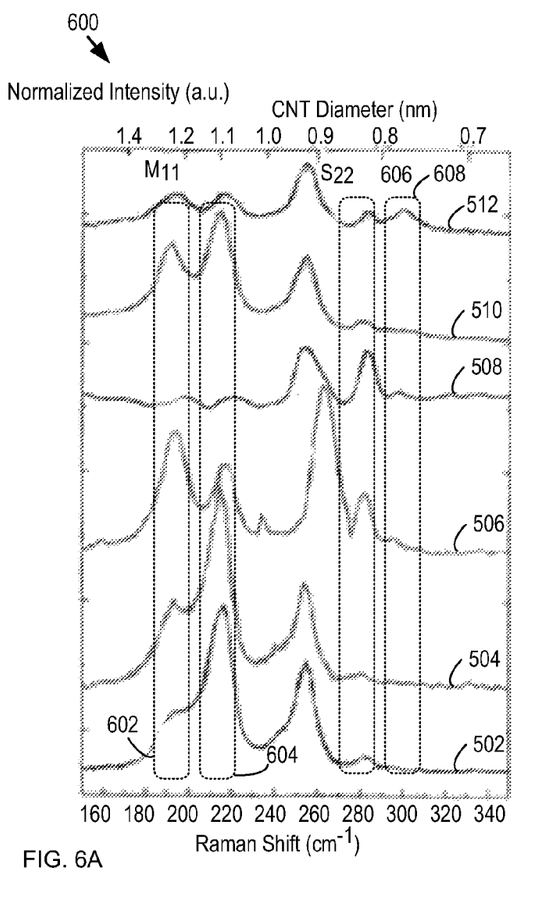
FIGS. 6A-6C depict the RBM regions of Raman spectra for carbon nanotube samples synthesized with compositionally tuned catalyst particles in accordance with the illustrative embodiment of the present invention.
Figure 6B:
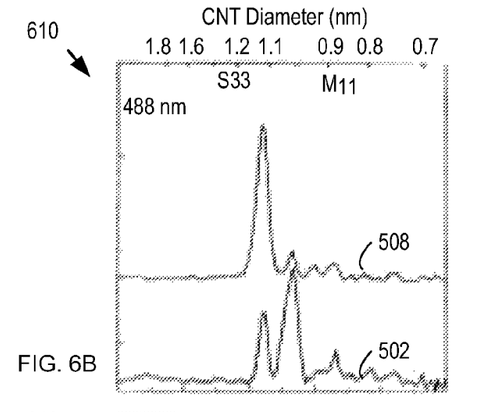
Figure 6C:
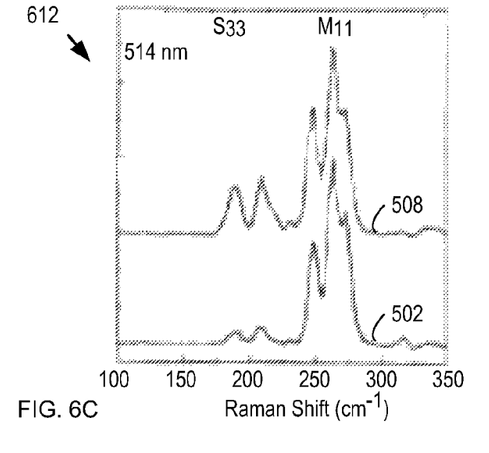

FIGS. 6A-6C depict the RBM regions of Raman spectra for carbon nanotube samples synthesized with compositionally tuned catalyst particles in accordance with the illustrative embodiment of the present invention. Spectral regions corresponding to the second- and third-order semiconducting transitions are labeled as S22 and S33, respectively, and the first-order metallic transition is labeled as M11.

Plot 600 shows peaks 606 and 608 (located at approximately 280 and 300 $cm^{-1}$, respectively) for the absorption spectra for carbon nanotube samples 502 through 512. Peaks 606 and 608 are stronger in the spectra for carbon nanotube samples grown via catalyst particles having an iron content of 50% or more. Further, peaks 602 and 604 (located at approximately 195 and 215 $cm^{-1}$, respectively) are significantly suppressed in the spectrum for carbon nanotube sample 508 (grown via nickel-iron catalyst particles having a composition of $Ni_{0.27}Fe_{0.73}$, at a growth temperature of 600° C.).

Peaks 602 and 604 correspond to larger-diameter metallic-type carbon nanotubes. Peaks 606 and 608 correspond to smaller semiconductor-type carbon nanotubes. As a result, plot 600 demonstrates a relationship between the iron content in $Ni_xFe_{1-x}$ catalyst particles and chirality of carbon nanotubes synthesized via those catalyst particles. Specifically, plot 600 shows that more selective growth of semiconductor-type carbon nanotubes occurs when $Ni_xFe_{1-x}$ catalyst particles have an iron content of 50% or more. Further, plot 600 suggests that the highest selectivity for semiconductor-type carbon nanotubes occurs when the catalyst particles have the formula $Ni_{0.27}Fe_{0.73}$.

Plots 610 and 612 show RBM spectra for samples 502 and 508, wherein the spectra are taken at excitation wavelengths of 488 and 514 nm, respectively. Plots 610 and 612 demonstrate that the fraction of semiconductor-type carbon nanotubes is higher in sample 508 (catalyst particles having the formula $Ni_{0.27}Fe_{0.73}$) than for sample 502 (catalyst particles of pure nickel).

At operation 204, a preferred value for catalyst-particle composition for catalyst particles 110 is selected based on the relationship between catalyst-particle composition and carbon-nanotube chirality established in operation 203. Based on this relationship, it is an aspect of the present invention that the preferred catalyst-particle composition for catalyst particles 110 is selected as $Ni_xFe_{1-x}$, wherein x is less than or equal to 0.5. In some embodiments, the preferred composition for catalyst-particles 110 is $Ni_{0.27}Fe_{0.73}$. By choosing a preferred composition for catalyst-particles 110 of $Ni_xFe_{1-x}$, wherein x is less than or equal to 0.5 (preferably 0.27), the present invention enables substantially selective synthesis of semiconductor-type carbon nanotubes.

At operation 205, catalyst particles 110 are introduced into CNT reactor 104. Catalyst particles 110 are characterized by a narrow size distribution centered on a diameter of approximately 2.2 nm. In some embodiments, catalyst particles 110 have a diameter that is less than or equal to 2.5 nm.

CNT reactor 104 is a conventional steady-state continuous-flow reactor furnace. In some embodiments, CNT reactor is a reactor other than a continuous flow reactor furnace, such as a high-vacuum growth chamber, etc.

CNT reactor 104 provides values for the temperature and pressure in the reactor to processor 118. Processor 118 maintains the temperature of CNT reactor 104 as approximately 600° C. The pressure of CNT reactor 104 is maintained as substantially atmospheric pressure. One skilled in the art will recognize that the values for temperature and pressure in CNT reactor 104 are matters of process design and that in some embodiments of the present invention they can be other than 600° C. and atmospheric pressure, respectively.

Processor 118 is a conventional processor suitable for receiving pressure and temperature information from each of catalyst reactor 102 and CNT reactor 104, controlling the pressure and temperature of each of catalyst reactor 102 and CNT reactor 104, and controlling the flow of gasses 106, 108, and 112 via mass flow controllers 120, 122, and 124.

Catalyst particles 110 are nanometer-scale, substantially spherical particles comprising nickel and iron. Catalyst particles 110 are substantially uniform in diameter and composition in accordance with the present invention. Each of catalyst particles 110 has a diameter that is less than approximately 2.5 nm. In some embodiments, each of catalyst particles 110 has a diameter of approximately 2.2 nm. In some embodiments, catalyst particles 110 comprise a metal that is other than either nickel or iron. Suitable metals for use in catalyst particles 110 include, without limitation, cobalt, ruthenium, and molybdenum. In such alternative embodiments, however, catalyst-particle size and catalyst-particle composition are independently controlled.

Figure 7:
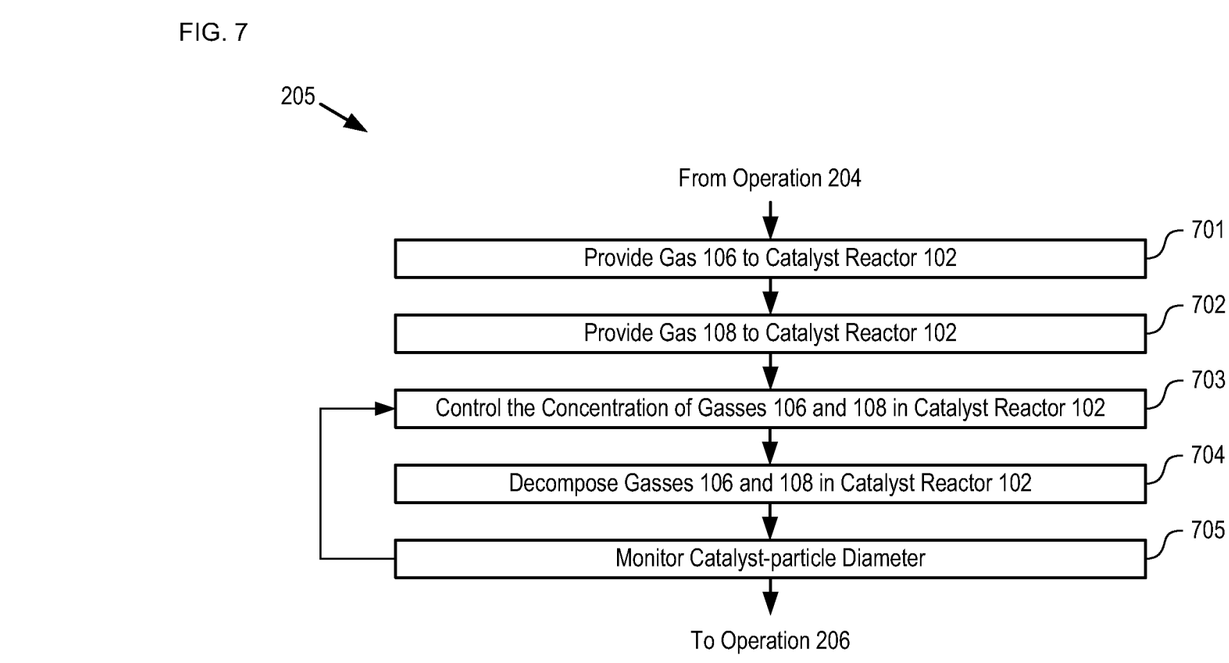
FIG. 7 depicts sub-operations suitable for providing catalyst particles to CNT reactor 104 in accordance with the illustrative embodiment of the present invention.

FIG. 7 depicts sub-operations suitable for providing catalyst particles to CNT reactor 104 in accordance with the illustrative embodiment of the present invention. Operation 205 begins with sub-operation 701, wherein gas 106 is provided to catalyst reactor 102.

Catalyst reactor 102 is an atmospheric microplasma reactor that is suitable for decomposing metallic precursor gas by electron impact ionization. In some embodiments of the present invention, metallic precursor gasses are decomposed in another non-thermal reaction. In some embodiments of the present invention, metallic precursor gasses are decomposed in another plasma reaction.

The volume of catalyst reactor 102 is approximately 1 nanoliter. In some embodiments, the volume of catalyst reactor 102 is less than 1 nanoliter. It is an aspect of the present invention that limiting the volume of the catalyst reactor to 1 nanoliter or less enables the growth of catalyst particles have catalyst-particle diameters less than 5 nm, wherein the catalyst particles have narrow size distribution.

Gas 106 is a metallic precursor gas that contains nickel. Suitable precursor gasses include, without limitation, nickelocene, ferrocene, and the like.

In the illustrative embodiment, gas 106 is provided by sublimation of packed solid nickelocene powder at room temperature with a flow of argon (Ar) gas. This flow of gas was than diluted with additional Ar gas and provided to mass flow controller 120.

Figure 8A:
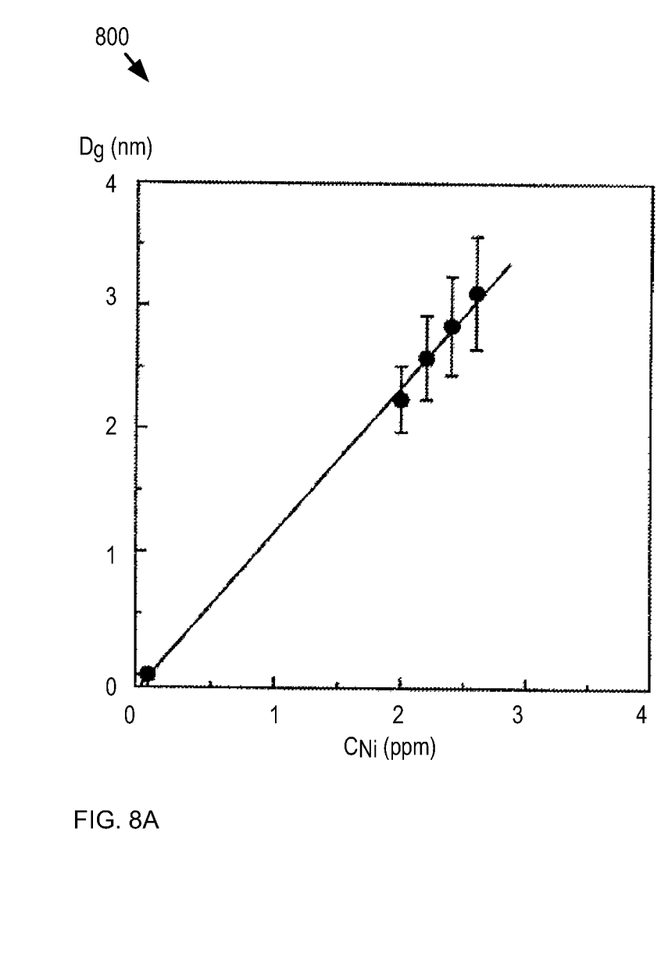
FIG. 8A displays a plot of synthesized catalyst-particle diameters with respect to metalocene concentration in accordance with the illustrative embodiment of the present invention.

FIG. 8A displays a plot of synthesized catalyst-particle diameters with respect to metalocene concentration in accordance with the illustrative embodiment of the present invention. Plot 800 shows data points for catalyst-particle diameters for nickel catalyst particles formed in a microplasma reactor with nickelocene concentrations of 2.0, 2.2, 2.4, and 2.6 ppm. It can be inferred from plot 800 that limiting the concentration of metalocene in catalyst reactor 102 to less than 2.6 ppm enables formation of catalyst particles having diameters of 2.5 nm or less. It can be further inferred that a linear relationship exists between the nickelocene concentration and nickel catalyst particle size, at least for concentration levels between 2.0 and 2.6 ppm.

Table 1 below provides a summary of catalyst-particle diameters for catalyst particles synthesized in different metalocene concentrations. Specifically, Table 1 provides measurement data for pure nickel catalyst particles formed in a microplasma reactor at different concentrations of nickelocene.

| Metalocene Concentration (ppm) | Catalyst-particle Diameter (nm) | Standard Deviation |
| --- | --- | --- |
| 2.0 | 2.2 | 1.13 |
| 2.2 | 2.6 | 1.13 |
| 2.4 | 2.8 | 1.15 |
| 2.6 | 3.1 | 1.16 |
| 5.2 | 4.7 | 1.22 |

It should be noted that the standard deviation for catalyst-particle diameter increases with increasing nickelocene concentration. As a result, by limiting metalocene concentration to 2.6 ppm or less, catalyst particles can be synthesized with narrow size distributions.

Figure 8B:
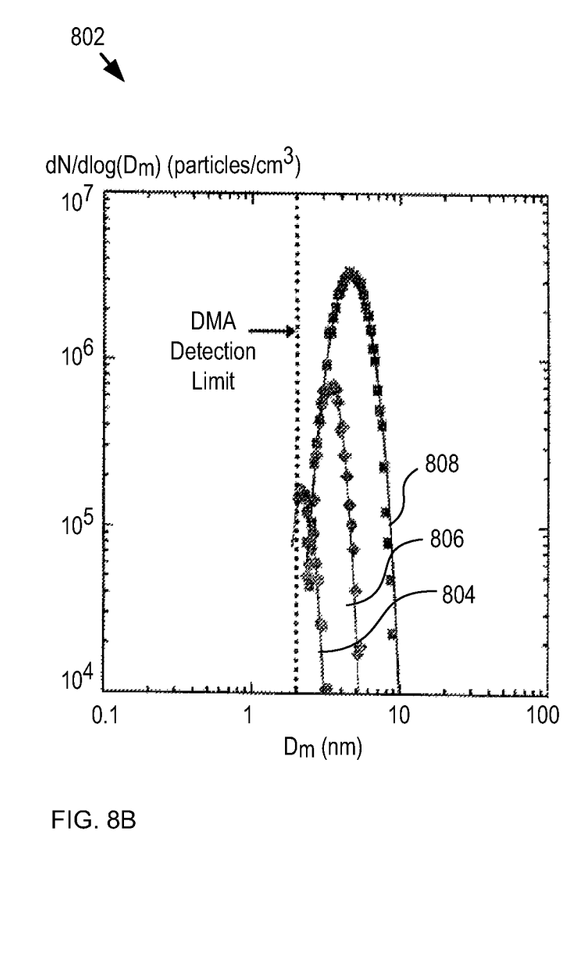
FIG. 8B displays a plot of distributions of catalyst-particle diameters synthesized in different metalocene concentrations in accordance with the illustrative embodiment of the present invention.

The narrowing of catalyst-particle diameter distribution with decreasing catalyst-particle diameter can be seen pictorially in FIG. 8B, which displays a plot of distributions of catalyst-particle diameters synthesized in different metalocene concentrations in accordance with the illustrative embodiment of the present invention. Plot 802 shows measured catalyst-particles diameters for nickel catalyst particle samples 804, 806, and 808, which were synthesized in a microplasma reactor with nickelocene concentrations of 2.0, 2.6, and 5.2 ppm, respectively. It can be clearly seen from plot 802 that the size distribution for catalyst particle sample 804 is narrower than the size distribution of catalyst particle sample 806, which is narrower than the size distribution of catalyst particle sample 808. Plot 802, therefore, supports the inference from plot 800 that catalyst diameter distribution becomes narrower as metalocene concentration decreases.

At sub-operation 702, gas 108 is provided to catalyst reactor 102. In some embodiments, gas 108 comprises ferrocene.

At sub-operation 703, processor 118 controls mass flow controllers 120 and 122 to maintain a total metalocene concentration in catalyst reactor 102 within the range of approximately 2.0 parts-per-million (ppm) to approximately 2.6 ppm. In some embodiments, the concentration of gas 106 in catalyst reactor 102 is controlled as 2.2 ppm.

The ratio of nickel to iron in a catalyst particle corresponds well to the relative concentrations of their respective metal precursors (i.e., gasses 106 and 108) in catalyst reactor 102. In the illustrative embodiment, therefore, processor 118 controls each of mass flow controllers 120 and 122 to maintain a ratio of nickelocene to ferrocene of approximately 27:73 in catalyst reactor 102. In some embodiments, the ratio of nickelocene to ferrocene maintained at or below 1:1 in catalyst reactor 102 to ensure a composition for catalyst particles 110 of $Ni_xFe_{1-x}$, wherein x is less than or equal to 0.5.

At sub-operation 704, gasses 106 and 108 are decomposed in catalyst reactor 102 to synthesize catalyst particles 110.

At sub-operation 705, monitor system 126 monitors catalyst-particle diameter for catalyst particles 110 in real time. Monitor system 126 comprises a cylindrical differential mobility analyzer (DMA) and an ultrafine condensation particle counter (CPC). Monitor system 126 samples catalyst particles 110 by enabling some of the catalyst particles to enter a bipolar charger. In the bipolar charger, the catalyst particles acquire a single positive or negative charge. The charged particles are then directed into the DMA. By adjusting the voltage applied by the DMA, particles having a specific narrow electrical mobility are transmitted and counted. This count is then provided to processor 118, which controls growth conditions in catalyst reactor 102 and the flow rates of gasses 106 and 108 (i.e., concentrations of gasses 106 and 108) to maintain the selected value for catalyst-particle diameter.

Returning now to FIG. 2, at operation 206, gas 112 is provided to CNT reactor 104. Gas 112 comprises acetylene ($C_2H_2$). In some embodiments, gas 112 comprises a different carbon-containing gas. Gasses suitable for use in gas 112 include, without limitation, carbon monoxide, methane, pentane, octane, and the like. In some embodiments, a second gas, such as hydrogen, is also provided to CNT reactor 104.

At operation 207, mass flow controller 124 controls the flow rate of gas 112, which determines its concentration in CNT reactor 104. Processor 118 controls mass flow controller 120.

At operation 208, processor 118 controls the carbon nanotube growth conditions within CNT reactor 104. Typical growth conditions controlled by processor 118 include growth temperature, reactor pressure, residence time of catalyst particles in the reactor, and the like. In the illustrative embodiment, the growth temperature in CNT reactor 104 is controlled to maintain 600° C.; however, it will be clear to one skilled in the art, after reading this specification, how to specify, make, and use alternative embodiments of the present invention wherein the temperature of CNT reactor 104 is maintained at a different growth temperature.

At operation 209, gas 112 is decomposed in CNT reactor 104, in the presence of catalyst particles 110, to synthesize carbon nanotubes 114, which are then provided at outlet 116.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for synthesizing a plurality of carbon nanotubes having controlled chirality, the method comprising:
    synthesizing a plurality of catalyst particles, wherein the plurality of catalyst particles is synthesized by operations comprising;
        providing a first gas comprising nickelocene to a first reaction chamber;
        providing a second gas comprising ferrocene to the first reaction chamber;
        controlling the ratio of the nickelocene and ferrocene in the first reaction chamber to be less than 1:1; and
        reacting the first gas and the second gas;
    providing the plurality of catalyst particles to a second reaction chamber, each of the plurality of catalyst particles being characterized by a catalyst-particle composition having the formula $Ni_xFe_{1-x}$, wherein x is less than 0.5; and
    reacting a third gas in the second reaction chamber in the presence of the plurality of catalyst particles, the third gas containing carbon.

2. The method of claim 1 further comprising:
    controlling the mean catalyst-particle diameter to be less than or equal to 2.5 nm.

3. The method of claim 2 wherein the mean catalyst-particle diameter is controlled to be within the range of 2.2 nm to 2.5 nm.

4. The method of claim 2 wherein the mean catalyst-particle diameter and the catalyst-particle composition are controlled independently.

5. The method of claim 1 wherein x is equal to 0.27.

6. The method of claim 1 wherein the ratio of the nickelocene and ferrocene is controlled to be 27:73.

7. The method of claim 1 wherein the plurality of catalyst particles is provided such that x is equal to 0.27.

* * * * *